(12) United States Patent
Sternitzke

(10) Patent No.: US 7,479,708 B1
(45) Date of Patent: Jan. 20, 2009

(54) WAVE POWER CONVERTER APPARATUS EMPLOYING INDEPENDENTLY STAGED CAPTURE OF SURGE ENERGY

(76) Inventor: Donald Alan Sternitzke, 5150 Hopner Ct., Colorado Springs, CO (US) 80919

( * ) Notice: Subject to any disclaimer, the term of this patent is extended or adjusted under 35 U.S.C. 154(b) by 0 days.

(21) Appl. No.: 11/845,778

(22) Filed: Aug. 27, 2007

(51) Int. Cl.
*F03B 13/26* (2006.01)

(52) U.S. Cl. ...................................................... 290/53
(58) Field of Classification Search .................... 290/53
See application file for complete search history.

(56) References Cited

U.S. PATENT DOCUMENTS

| | | | | |
|---|---|---|---|---|
| 430,790 | A | * | 6/1890 | Black ............................ 405/76 |
| 655,541 | A | * | 8/1900 | Lininger ...................... 417/100 |
| 1,474,571 | A | * | 11/1923 | Wielgolaski ............... 415/53.1 |
| 1,507,461 | A | | 9/1924 | Chase |
| 3,271,959 | A | * | 9/1966 | Van Gils ....................... 60/398 |
| 3,687,567 | A | * | 8/1972 | Lininger ......................... 415/7 |
| 4,013,379 | A | | 3/1977 | Bodling |
| 4,040,257 | A | | 8/1977 | Andrews |
| 4,078,871 | A | | 3/1978 | Perkins, Jr. |
| 4,139,984 | A | | 2/1979 | Moody et al. |
| 4,263,516 | A | | 4/1981 | Papadakis |
| 4,332,506 | A | | 6/1982 | Andrews |
| 4,622,471 | A | | 11/1986 | Schroeder |
| 5,443,361 | A | | 8/1995 | Skaarup |
| 6,527,504 | B1 | | 3/2003 | Skaarup |
| 7,040,089 | B2 | | 5/2006 | Andersen |
| 7,144,197 | B2 | * | 12/2006 | Black ............................ 405/79 |

FOREIGN PATENT DOCUMENTS

| | | | |
|---|---|---|---|
| EP | 573242 A1 | * | 12/1993 |
| GB | 2327241 A | * | 1/1999 |
| GB | 2412409 A | * | 9/2005 |

OTHER PUBLICATIONS

Kikuchi et al, Development of Wave Power Generating System With Water Valve Rectifier, IEEE Trans. Magnetics, V37, N4, Jul. 2001, pp. 2865-2867.
Author Unknown, Wave Dragon Principles, Published Online at www.wavedragon.net, Jun. 2007.

* cited by examiner

*Primary Examiner*—Joseph Waks
(74) *Attorney, Agent, or Firm*—James Albert Ward

(57) ABSTRACT

A wave power converter employing independently staged surge energy capture for converting useful wave surge energy to electric power over a relatively broad range of surf conditions. The wave surge power converter includes an inclined ramp with several openings for receiving wave water into several independent chambers for capturing and retaining surge water in hydraulic isolation, a check valve in each chamber permitting water to flow into a conduit and a generator for producing electrical power from water flow in the conduit. The apparatus is suitable for low-cost manufacture, offers simple robust operation suitable for underdeveloped regions of the world, may be fabricated from commonly-available components, requires few moving parts and no valuable (lootable) components other than a generator, and is self-flushing for low maintenance operation.

20 Claims, 8 Drawing Sheets

WAVE POWER CONVERTER APPARATUS EMPLOYING INDEPENDENTLY STAGED CAPTURE OF SURGE ENERGY

BACKGROUND OF THE INVENTION

1. Field of the Invention

This invention relates generally to a wave power converter and more particularly to a wave power converter employing a plurality of independent water chambers to capture both vertical and horizontal components of surge energy from overtopping waves.

2. Description of the Related Art

Wave power as a means of generating electricity has been the focus of low-key study in the US and Europe for over thirty years, but with little public support. Wave energy flux arises primarily from wind friction at the sea surface and is entirely distinct from the diurnal flux of tidal energy arising from the lunar cycle and from the steady flow of the major ocean currents arising primarily from the several solar heating and cooling cycles. Wave power generation is not a widely employed technology. The world's first commercial wave energy conversion farm, the Aguçadora Wave Park in Portugal, was established in 2006. Public interest in this carbon-free power source is now growing because of recent public concern over the accumulating effects of atmospheric carbon loading on world climate.

Ocean waves are generated from a portion of the wind energy coupled to the ocean surface over large areas and the available wave energy in a local region is greater than the solar and wind energies available in the same area. Wave energy available from U.S. coasts alone exceeds the entire U.S. production of coal-fired electrical power, constitutes a perpetual, renewable energy source, and is perhaps the only carbon-free energy source suitable for replacing carbon-based power production on a very large scale without concomitant environmental effects.

The prior art is replete with wave power conversion proposals. Wave power conversion devices may be generally categorized by the choice of energy capture method used to capture the wave energy. They may also be categorized by choice of location and by choice of power extractor. Types of energy capture methods well-known in the art include point absorber or buoy; surfacing and following or attenuator; terminator with perpendicular alignment to wave propagation; oscillating water column; and overtopping. Location types well-known in the art include shoreline, near-shore and off-shore. Well-known types of power extraction systems include: hydraulic ram, elastomeric hose pump, pump-to-shore, hydroelectric turbine, air turbine, and linear electrical generator.

For example, in U.S. Pat. No. 4,622,471, Schroeder proposes a terminator system using a plurality of units with unidirectional intake gates disposed horizontally at one elevation to operate independently to capture wave surges upstream from an input penstock. They are adapted to intercept waves and convert their kinetic energy to drive a turbine. Each gate unit includes a horizontally-hinged movable gate adapted to permit the incoming waves to slide over the upper surfaces of the gates and into the penstock. The penstock back pressure operates to push each gate upward to direct the remaining forward moving wave energy to a higher elevation, thereby increasing the water head in the penstock. Schroeder controls the penstock head by applying the same penstock back pressure to every gate unit, which are accordingly hydraulicly coupled to one another (not in hydraulic isolation). Schroeder neither considers nor suggests adapting his wave power converter to an overtopping method that retains the captured water at different head pressures in a plurality of substantially isolated chambers each coupled to a penstock, some by way of a check valve.

As another example, in U.S. Pat. No. 7,040,089, Andersen proposes an overtopping wave power station device of the kind where the waves flow up a ramp provided with fixed openings arranged so that little of the water flowing up the ramp flows down through the openings and water flowing down the ramp flows down through the openings and into storage reservoirs positioned below the ramp and extending horizontally at various elevations. Andersen couples each storage reservoirs to an associated penstock and turbine intake. All turbine outlets are coupled together, thereby equalizing the head pressures. Andersen relies on ramp intake closing devices to reduce water and head losses at the ramp openings to the lower storage reservoirs and neither considers nor suggests adapting his overtopping wave power converter to retain the captured water at different head pressures in a plurality of substantially isolated chambers each coupled to a penstock, some by way of a check valve.

Normally, the relation between output and investment grows advantageously with the size of the plant. In many cases, it pays to build large plants. However, a large rotating machine, such as a turbine equipped with a generator, costs more than a number of smaller machines with a corresponding total capacity. Complex systems such as hydraulic control systems, are not well suited to incremental implementation (do not scale up well), and have high costs and risks associated with large installations.

Traditionally, low head water turbines have been of an open type, as exemplified for example by conventional water wheels, and have had extremely low efficiency. Conventional power generation turbines such as Francis turbines, Kaplan turbines and Peleton turbines traditionally require high heads of water to generate the water pressure and velocity required to move the turbine blades. Such arrangements require large high dams, additional flumes and the like, requiring massive capital expenditures. A more efficient class of turbines, such as the Root Turbine, for example, can be economically constructed to operate at the higher efficiencies suitable for low head electric power generation applications requiring closed turbine systems to maintain siphon.

Another well-known challenge is to provide a wave power converter able to tolerate the sometimes volatile conditions of the sea surface. Some practitioners suggest selecting installation sites where the average waves are similar in scope to the extreme waves. Also, the wave power converter must withstand a major storm while also operating with acceptable efficiency during average wave conditions.

These unresolved problems and deficiencies are clearly felt in the art and are solved by this invention in the manner described below.

SUMMARY OF THE INVENTION

This invention solves the above described problems by introducing for the first time a wave power converter having means for the independently staged capture of wave surge energy vertical and horizontal components from a broad range of wave conditions to facilitate a stable supply of hydraulic head pressure for conversion to electrical power.

It is a purpose of this invention to provide wave power converter apparatus employing independently staged surge energy capture for converting useful wave surge energy over a relatively broad range of surf conditions, including relatively calm surf conditions and abnormally higher surf conditions. It is an advantage of the independently staged surge energy capture apparatus that some energy may be captured from low surf and more energy may be captured from higher surf without the need for adjusting the apparatus. It is a feature of the converter of this invention that the disposition of the 5 independent chambers are disposed to capture and convert a significant amount of the horizontal surge kinetic energy component into potential energy in the form of elevated hydraulic head.

It is another purpose of the invention to provide a wave surge power converter suitable for low-cost manufacture and simple robust operation in underdeveloped regions of the world. It is an advantage of the apparatus of this invention that it is suitable for fabrication from low-cost commonly-available components. It is another advantage of this invention that the power converter apparatus has few moving parts, has no valuable (lootable) components other than a generator, is self-flushing and requires little maintenance.

In one aspect, the invention is a wave surge power converter having a ramp with an inclined surface providing several openings for receiving wave surge water when a wave surges up the inclined surface; several independent chambers each located under an associated ramp opening for capturing the received wave surge water and retaining the captured water in substantial hydraulic isolation from the other chambers; a conduit having an exit; a check valve disposed within each of one or more chambers to permit water flow into the conduit from the chamber responsive to a hydraulic pressure difference across the check valve; and a generator for producing electrical power from a flow of water in the conduit arising from a hydraulic pressure difference between the conduit and the exit.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 4A, is a diagram illustrating a front view of the apparatus of FIG. 1;

DETAILED DESCRIPTION OF THE EMBODIMENTS

Figure 1:
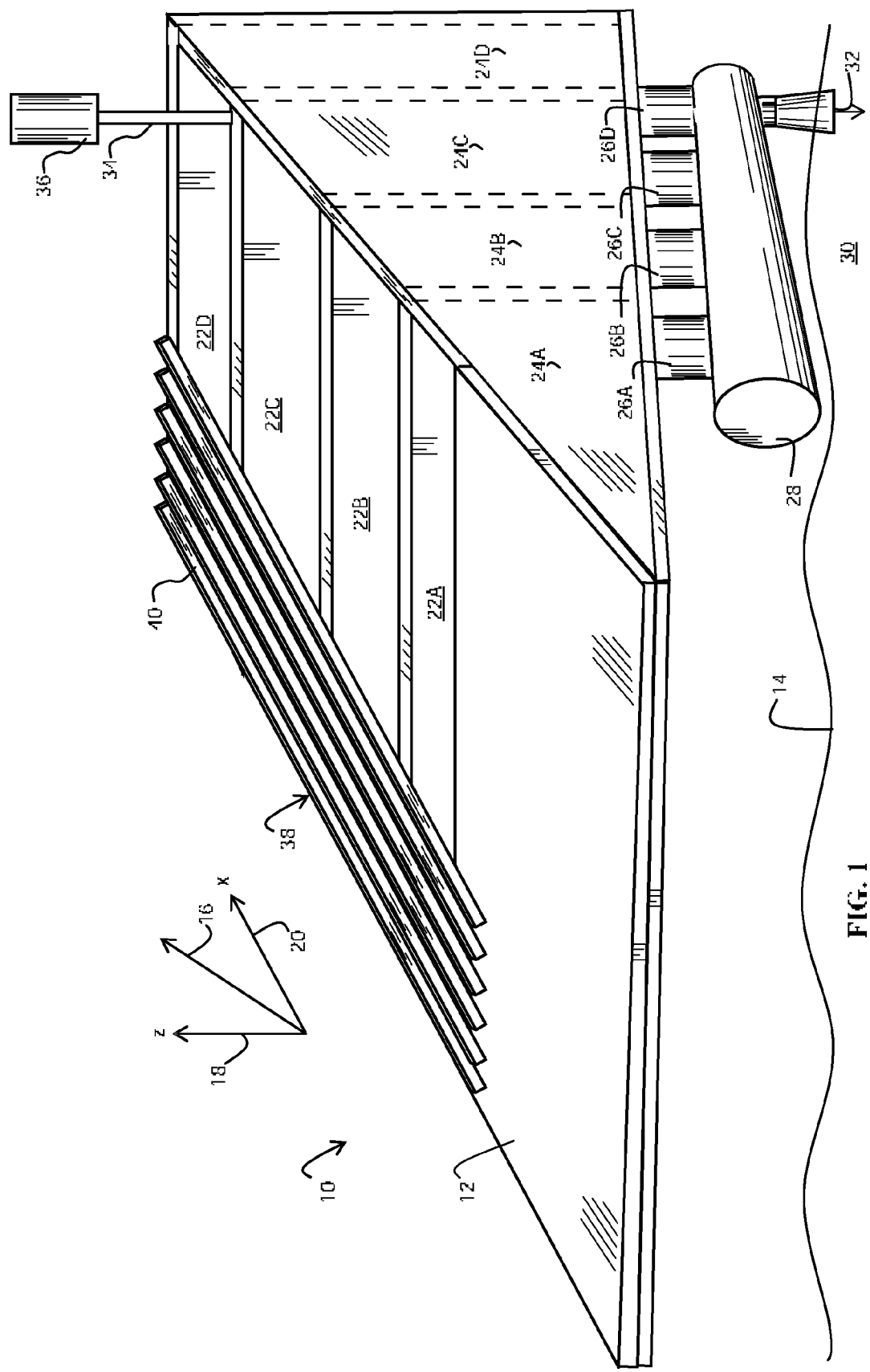
FIG. 1 is a diagram illustrating a perspective view of a preferred embodiment of the wave surge power converter apparatus of this invention.

FIG. 1 illustrates a preferred wave surge power converter embodiment 10 of this invention, showing the inclined ramp 12. During operation, converter 10 is preferably disposed at an ocean surface 14 having episodic wave surges generally oriented in the direction indicated by the arrow 16 such that a typical wave surges vertically generally along the vertical surge component 18 and horizontally generally along the horizontal surge component 20. Ramp 12 is shown with a slope of about 33% (17-18 degrees) and is preferably oriented generally along surge direction 18 such that the wave surge water moves up ramp 12, progressing along a series of openings 22A-D therein. Each of openings 22A-D that are thereby exposed to the wave surge then receives surge water into the associated one of the plurality of independent chambers 24A-D. Each of the first independent chambers 24A-C is substantially isolated hydraulically from its neighbors by means of a single check valve (described below in connection with FIGS. 2, 3 and 6A-B) disposed in the associated one of the plurality of drain assemblies 26A-C. No check valve is required in drain assembly 26D for the final chamber 24D because the hydraulic head in chamber 24D is made equal to the hydraulic head in conduit 28 for reasons described in more detail below. As may be readily appreciated from this description, any surge water captured within each chamber 24A-D flows down by gravity through the associated drain assembly 26A-D into a plenary conduit 28 and out into the ambient ocean 30 through the draft tube 32. This flow of captured water from each of one or more chamber(s) 24A-D through the associated drain assembly 26A-D into conduit 28 and out draft tube 32 arises from the hydraulic pressure difference between at least one chamber(s) 24A-D and ambient ocean 30 and may be employed to turn a low-head turbine (not visible, see FIGS. 2, 5 and 6A-B) within conduit 28 that is coupled by means of, for example, a shaft 34 to a generator 36 for generating electrical power. The substantial hydraulic isolation of chambers 24A-D is an important feature of converter 10 for reasons that are described in more detail below. Another important feature of converter 10 is the grill 38 or "trash rack" formed from a plurality of slats, exemplified by the slat 40 (FIG. 4A), disposed over openings 22A-D to prevent most floating debris from entering chambers 24A-D by facilitating the sloughing of debris back into the surf during the relaxation of the wave surges. For clarity, grill 38 is only partially illustrated in FIG. 1 and actually extends across the entire width of converter 10 to completely cover all of openings 22A-D.

Figure 2:
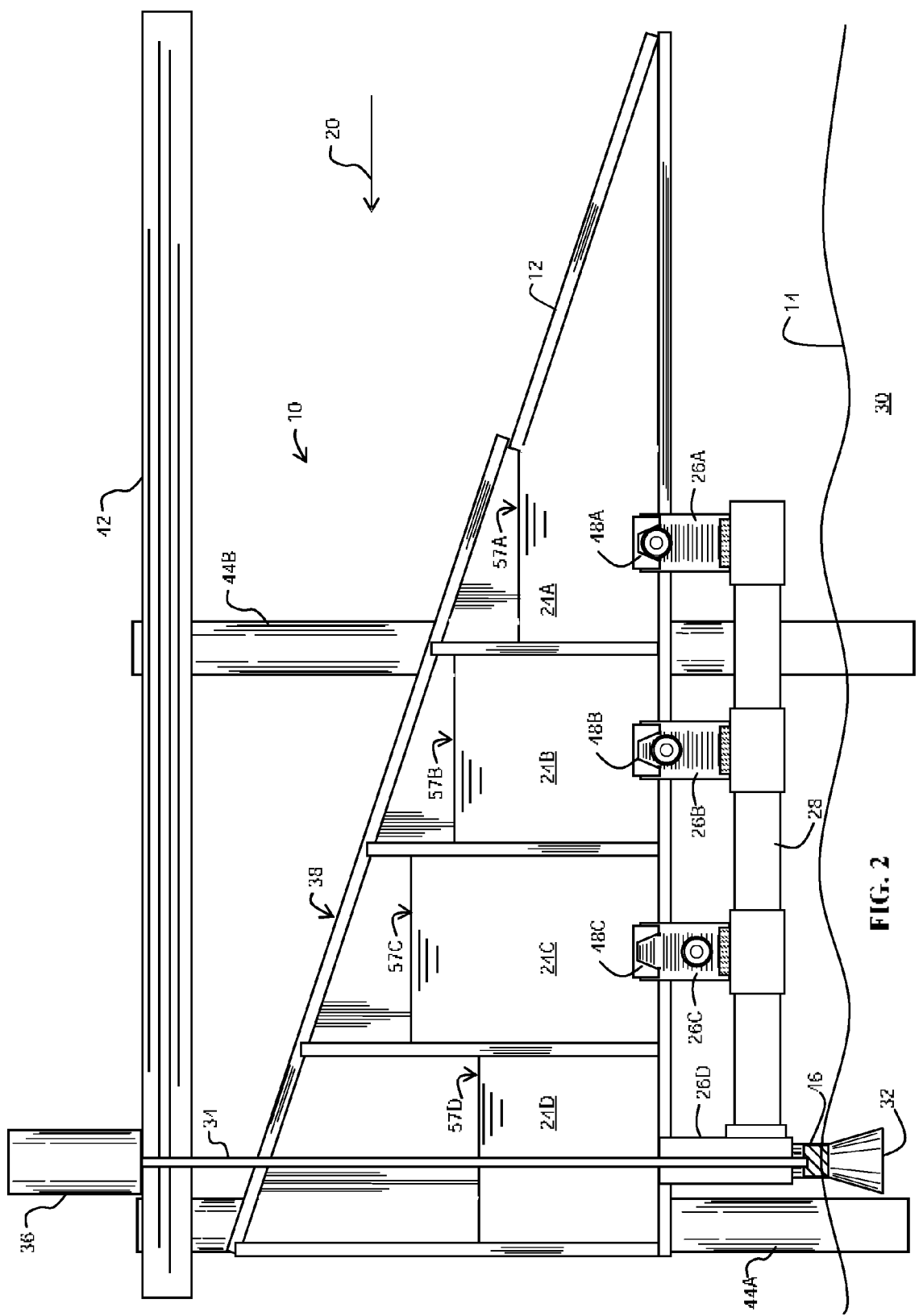
FIG. 2 is a diagram illustrating a side cross-sectional view of the apparatus of FIG. 1.
Figure 3:
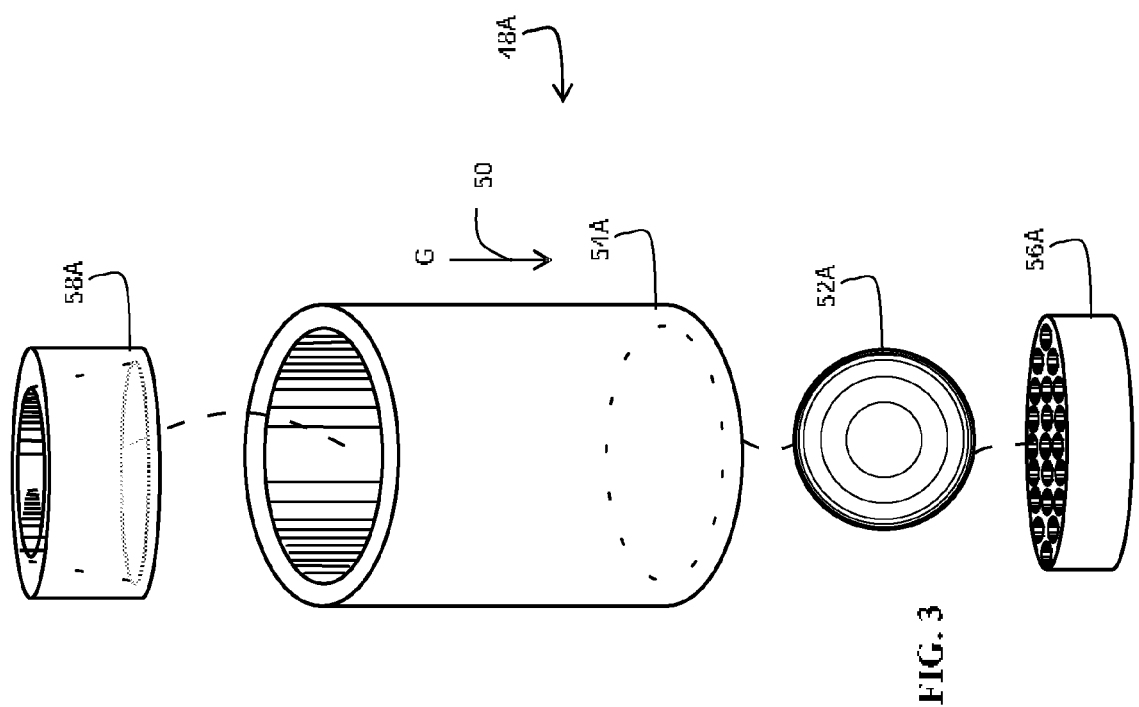
FIG. 3 is a diagram illustrating an exploded perspective view of a preferred check valve embodiment suitable for use with the apparatus of FIG. 1.

FIG. 2 is a diagram illustrating a side view of converter 10 disposed in an exemplary operating position under a pier 42 by means of, for example, the two structural supports 44A-B. The disposition of the closed low-head turbine 46 may also be seen in draft tube 32 and the disposition of each of the plurality of check valves 48A-C may be seen in the associated drain assemblies 26A-C. For example, check valve 48A operates to prevent water flow from conduit 28 to chamber 24A in the following manner. FIG. 3 illustrates an exploded perspective view of an illustrative embodiment of check valve 48A, which exemplifies any of the plurality of check valves 48A-C. During operation check valve 48A is oriented with respect to gravity as shown by the gravity arrow 50. A float ball 52A is retained within a drain pipe 54A between a lower sieve plate 56A and an upper valve seat 58A so that, when hydraulic pressure at the bottom of chamber 24A exceeds the hydraulic pressure in conduit 28 (FIGS. 1-2), water flow urges float ball 52A away from valve seat 58A, thereby permitting water to flow downward through drain pipe 54A and through sieve plate 56A into conduit 28 (FIGS. 1-2). Should the hydraulic pressure in conduit 28 equal or exceed the hydraulic pressure at the bottom of chamber 24A, then check valve 48A closes to prevent any water flow in the upward direction because float ball 52A urges against valve seat 58A, thereby closing off all flow in drain pipe 54A. These elements of check valve 48A are suitable for simple and inexpensive manufacture for robust performance. For example, valve seat 58A and drain pipe 54A may be embodied as simple sections of PVC pipe, float ball 52A may be embodied as a simple rubber sphere (e.g., a ball), and sieve plate 56A may be embodied as a simple plastic drain sieve, for example.

Returning to FIG. 2, the hydraulic chamber independence feature of converter 10 is now described. From FIG. 2, it may be readily appreciated that the hydraulic head within conduit 28 generally approaches but cannot exceed the highest of the independent chamber hydraulic heads 57A-D within chambers 24A-D. Hydraulic heads 57A-D illustrated in FIG. 2 exemplify a snapshot of the relationship among chambers 24A-D typically resulting from the cumulative capture of water from various wave surges overtopping ramp 12 and encountering openings 22A-D (FIG. 1) and an unchecked flow of water from chamber 24D down and out through drain assembly 26D to conduit 28. Accordingly, check valve 48A is illustrated as operating to check water flow through drain assembly 26A from chamber 24A into conduit 28 because hydraulic head 57A (the water level) in chamber 24A is illustrated to be less than hydraulic head 57C (the highest chamber water level) within conduit 28. Similarly, check valve 48B is illustrated as operating to restrict water flow through drain assembly 26B from chamber 24B into conduit 28 because the water level (hydraulic head) in chamber 24B is illustrated to be less than the hydraulic head within conduit 28 but greater than the hydraulic head 57A in chamber 24A. Finally, check valve 48C is illustrated as fully open to permit unchecked water flow through drain assembly 26A from chamber 24A into conduit 28 because hydraulic head 57C (the water level) in chamber 24C is illustrated to be the highest chamber water level, which is equal to the hydraulic head in conduit 28 unless incoming wave surges fill chamber 24D. No check valve is required in drain assembly 26D for the final chamber 24D because the hydraulic head in chamber 24D is always equal to or less than the hydraulic head in conduit 28 and final chamber 24D operates as a surge chamber for the remaining chambers 24A-24C to moderate hydraulic head fluctuations and temporarily store water not immediately flowing through conduit 28 to turbine 46. The relatively large volume of chamber 24D contributes to the maintenance of a steady useable flow and generation of power therefrom.

From the above, it may be readily appreciated that the primary flow through conduit 28 results from the chamber having the highest hydraulic head (water level). As the highest-head chamber drains and approaches the head of neighboring independent chambers, these begin to flow into conduit 28, thereby maintaining the water flow through turbine 46 necessary for effective power generation. As illustrated in FIG. 2, unchecked chamber 24D is prevented from flowing only by the back-pressure from conduit 28 from the higher hydraulic head 57C in chamber 24C. As hydraulic head 57C falls, hydraulic head 57B begins to flow, followed by hydraulic head 57D, and finally by hydraulic head 57A. This staged capture and flow procedure exemplifies the operation of convertor 10 of this invention. Because chambers 24A-D are disposed in substantial alignment with horizontal surge component 20 (FIG. 1) and openings 22A-D are disposed at different elevation along vertical wave surge component 18, each chamber 24A-D will capture water from certain wave surges and not from others; but the staged capture and flow operation ensures a steady useable generation of power therefrom. Because turbine power output increases proportionately to the product of hydraulic head and flow rate, converter 10 is suitable for operation at low hydraulic pressure differences and high flow rates. This is advantageous because the mass and velocity of incoming wave surges tends to limit available hydraulic head but flow volume is limited only by the scale of converter 10, which may be scaled up in either horizontal dimension to any useful size and number of isolated chambers.

Figure 4:
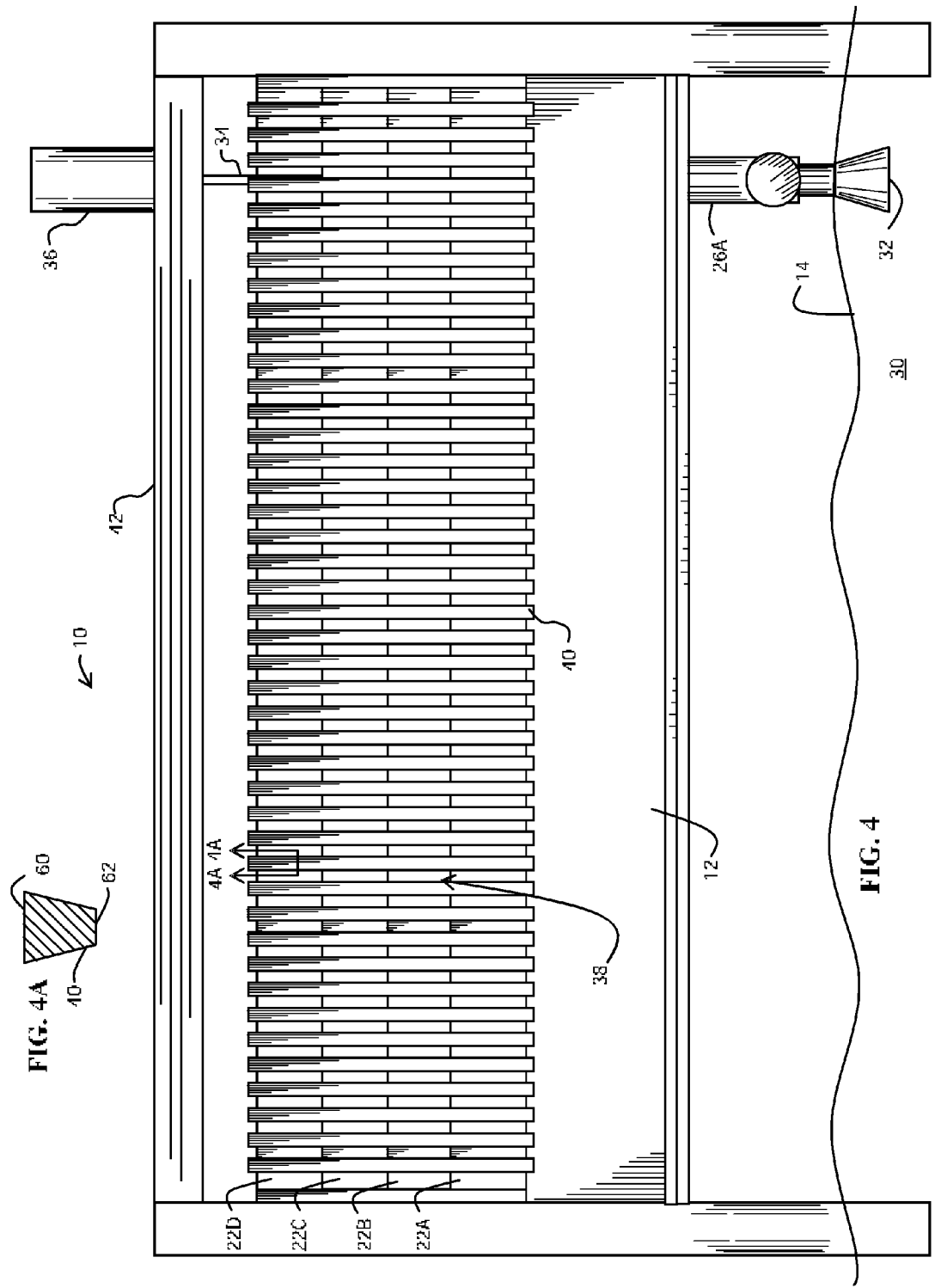
FIG. 4, including detail

FIG. 4 illustrates a front view of converter 10, showing the entire embodiment of grill 38 and detail FIG. 4A illustrates a cross-sectional view of a useful embodiment of slat 40, showing the upper surface 60 to be larger than the lower surface 62. This trapezoidal cross-section facilitates trash rejection without significant reduction of water capture when slats of this cross-section are arrayed to form grill 38. Moreover, the narrow separations urge the incoming wave surge water further up ramp 12 before capture, thereby converting a significant amount of the horizontal surge kinetic energy component 20 into potential energy in the form of elevated hydraulic head. This improved conversion of horizontal kinetic energy into stored potential energy is an important feature of the converter of this invention. Although ramp 12 is illustrated as having a single linear slope from end to end, an alternative ramp embodiment (not shown) having a concave or convex curved surface whose elevation varies non-linearly from end to end may be useful for optimizing kinetic to potential energy conversion in various alternative ocean conditions.

During operation, as described above, converter 10 continuously captures and converts the surge kinetic energy component into stored hydraulic head. This stored potential energy is then converted to electrical energy by releasing the stored water through closed low-head turbine 46. The combined storage volume of independent chambers 24A-D is balanced with the flow rate exiting from draft tube 32 to facilitate continuous stable rotation of closed low-head turbine 46 and the coupled electrical generator 36, thereby providing a steady supply of electrical power from episodic wave surges.

The theoretical relationship between the surge kinetic energy KE in joules and the resulting stored potential energy PE in joules (assuming lossless conversion) is expressed by the following:

$$KE = m \cdot v^2/2 = m \cdot g \cdot h = PE \qquad \text{[Eqn. 1]}$$

wherein:
m=Mass of incoming surge water (kg),
v=Surge water velocity (m/sec),
g=Gravitational constant (m/sec$^2$), and
h=Available hydraulic head (m).

Eqn. 1 demonstrates that hydraulic head h varies directly with the square of surge water velocity v, making the faster wave surge a more useful source of energy. During operation of converter 10, surge kinetic energy is converted to potential energy because surge water rushes up grill 38 before draining down into one or more independent chambers 24A-D. Water held in each chamber is isolated hydraulicly from the other chambers by check valves check valves 48A-C, which together facilitate a generally evacuated (entrainment air-free) and continuous supply of seawater to turbine 46. Independent chambers 24A-D operate to maintain a full flow in conduit 28 by providing a staged reserve supply during wave surge "dry spells." Turbine 46 rotates responsive to the flow of water from conduit 28 through draft tube 32 and into ambient ocean 30. Draft tube 32 extends downward to preserve a siphon (suction) head when ocean surface 14 drops below the base of turbine 46, which contributes to the aggregated hydraulic head powering turbine 46 and thus to the resulting output power from generator 36. The exit of draft tube 32 must remain submerged to maintain siphon head.

Available converter output power is expressed by the following:

$$HP = Q \cdot h \cdot g \cdot n / C \quad \text{[Eqn. 2]}$$

where:
  HP=Power delivered by the turbine (hp)
  Q=Mass flow rate through the turbine (kg/sec)
  h=Available hydraulic head. (m)
  g=Gravitational constant (m/sec$^2$),
  n=Turbine efficiency (%), and
  C=Unit conversion factor=746 W/hp.

Eqn. 2 demonstrates that turbine output power HP varies directly with hydraulic head h and mass flow rate Q. Accordingly, converter 10 operates at high mass flow rates to produce useful power from low hydraulic heads. The available hydraulic head h is limited by the mass and velocity of the incoming wave surges and mass flow rate Q is limited by the scale of conduit 28 and chambers 24A-D; that is, by the scale of the structure of converter 10.

Figure 5:
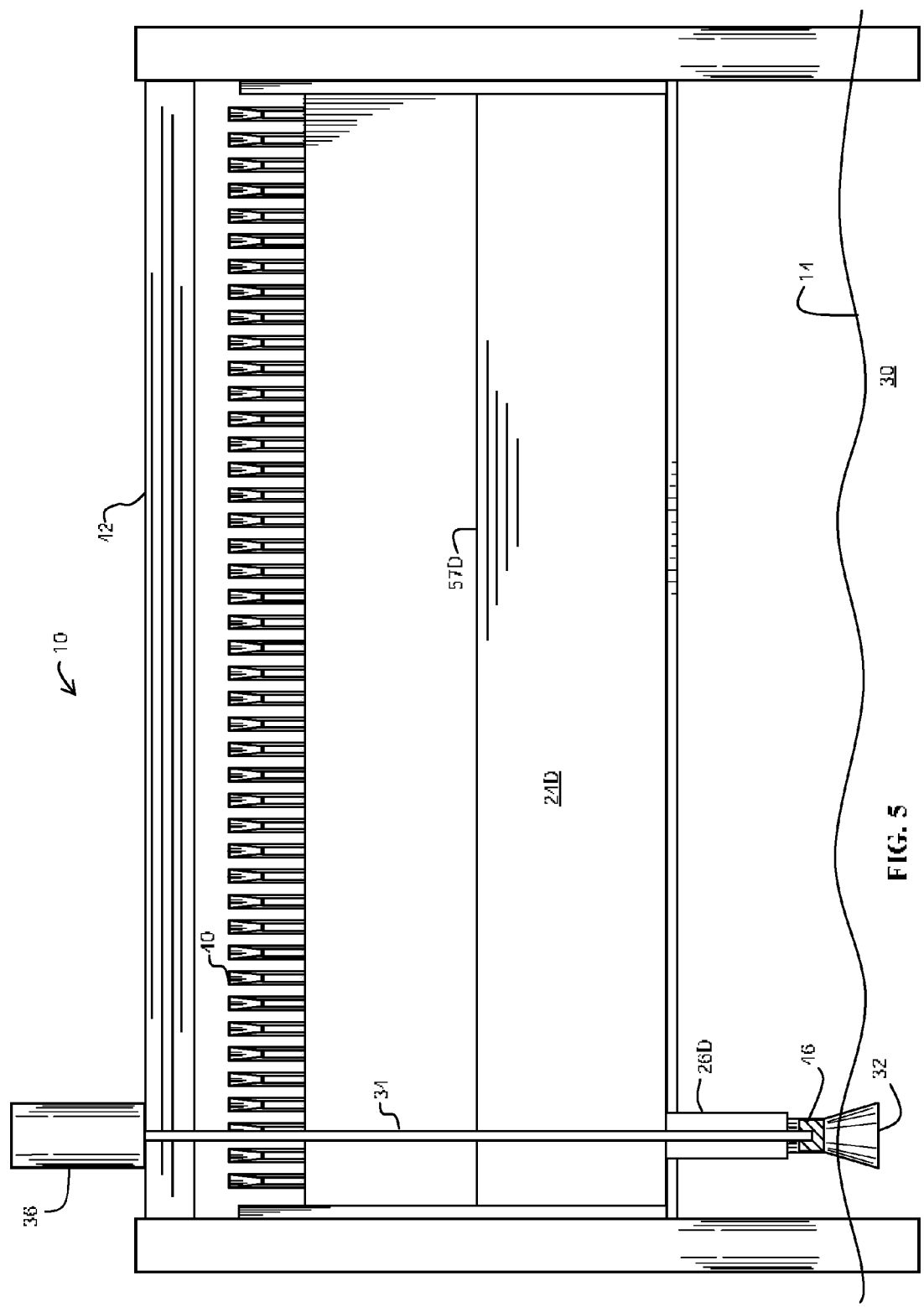
FIG. 5 is a diagram illustrating a rear view of the apparatus of FIG. 1 with the tail-wall removed to expose the interior of the rear chamber.

FIG. 5 illustrates a rear view of converter 10, with the tail-wall removed to show the interior of final chamber 24D and other elements of converter 10 described above in connection with FIGS. 1-4. Note that draft tube 32 has a submerged exit, which should be disposed to ensure that the siphon lock between draft tube 32 and ambient ocean 30 is not lost during normal wave action.

Figure 6A:
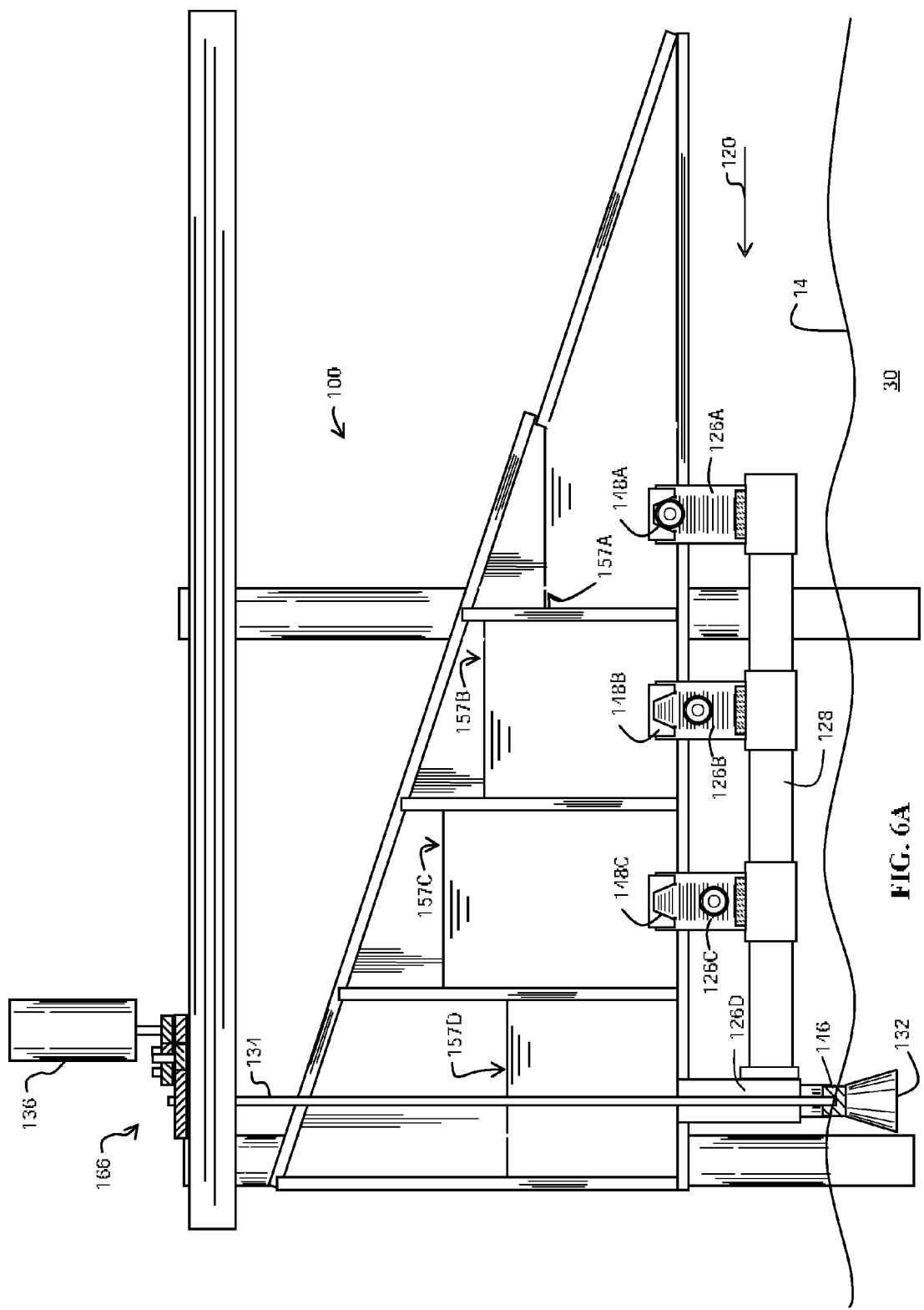
FIG. 6A is a diagram illustrating a side cross-sectional view of an alternative embodiment of the wave surge power converter apparatus of this invention showing exemplary check valve dispositions during normal flow conditions.

FIG. 6A illustrates a side view of an alternative wave surge power converter apparatus embodiment 100 showing the plurality of drain assemblies 126A-D and exemplary dispositions of the check valves 148A-C during normal flow conditions, which occur when ocean surface 14 remains below the highest of the independent chamber hydraulic heads 157A-D while remaining above the exit of the draft tube 132 to maintain siphon head through the turbine 146. Converter 100 includes a shaft 134 for coupling turbine 146 to a generator 136 but also provides an additional reversible transmission 166 to facilitate uninterrupted power conversion during backflow conditions that are now described.

Backflow conditions may arise whenever the ocean surface 114 rises and remains above one or more of independent chamber hydraulic heads 157A-D so that water is urged up through the draft tube 132, backing up through turbine 146, and into the conduit 128. Backflow operation should not be necessary for most ocean conditions, but converter embodiment 100 is now described as a useful solution to operations in ocean surf states leading to occasional backflow conditions.

Figure 6B:
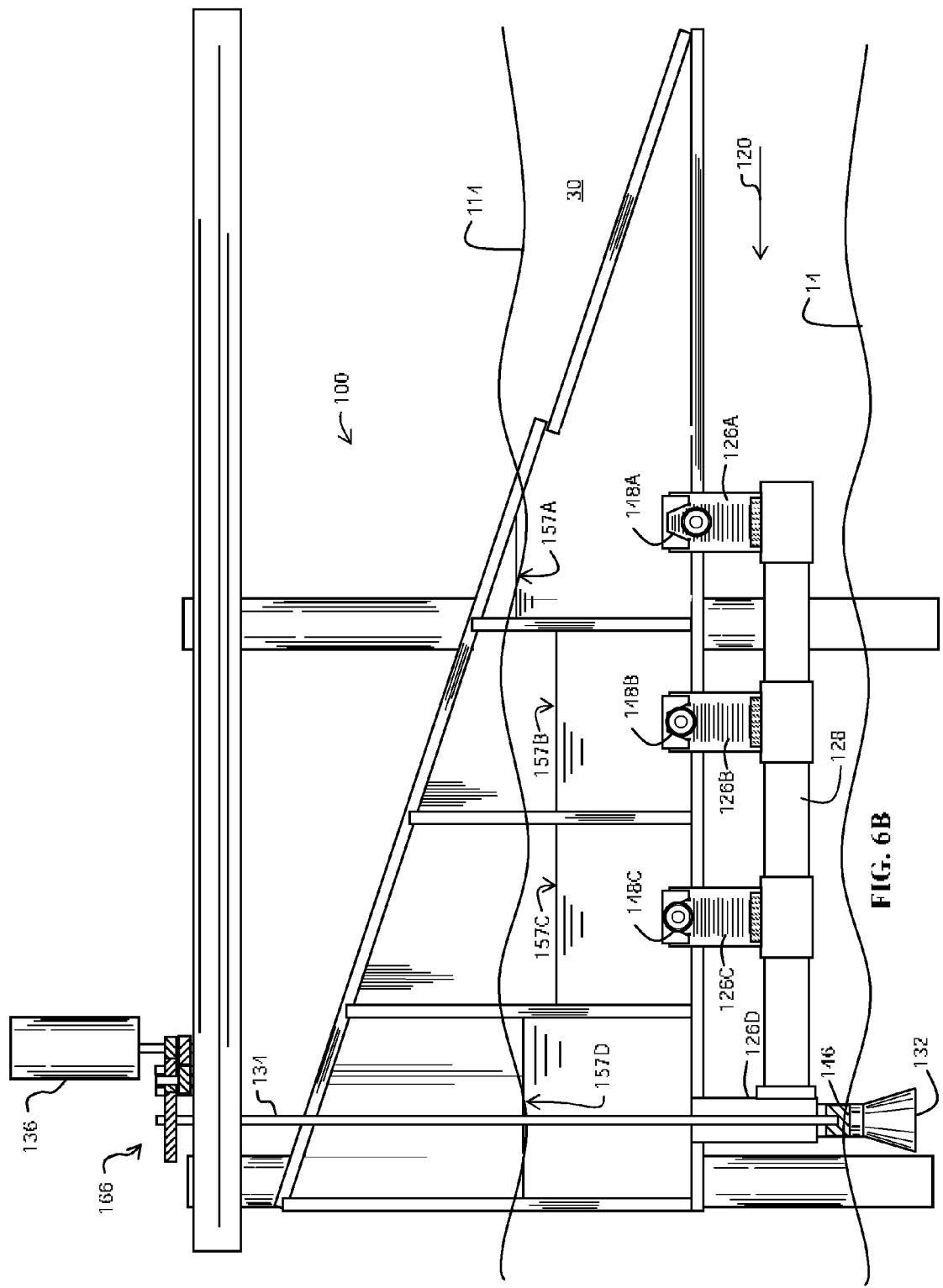
FIG. 6B is a diagram illustrating a side cross-sectional view of the wave surge power converter apparatus of FIG. 6A showing exemplary check valve dispositions during abnormal back-flow conditions.

FIG. 6B is a diagram illustrating a side view wave surge power converter 100 showing illustrative dispositions of check valves 148A-C during abnormal backflow conditions that may arise when ocean surface 114 is elevated above the highest one of independent chamber hydraulic heads 157A-D. During operation, significant backflow up draft tube 132 and turbine 146 causes turbine 146 to reverse direction and rise up, thereby lifting shaft 134 to effect a gear shift in transmission 166, thereby preventing a polarity reversal in generator 136.

Figure 7A:
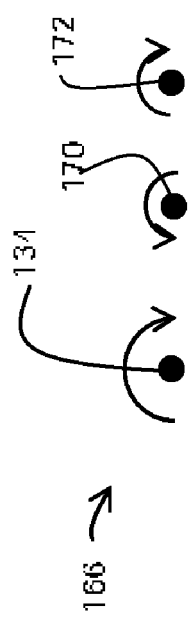
FIGS. 7A-B are schematic diagrams illustrating a top view of an illustrative transmission embodiment suitable for use with the apparatus of FIGS. 6A-B under the two exemplary flow conditions illustrated in FIGS. 6A-B.
Figure 7B:
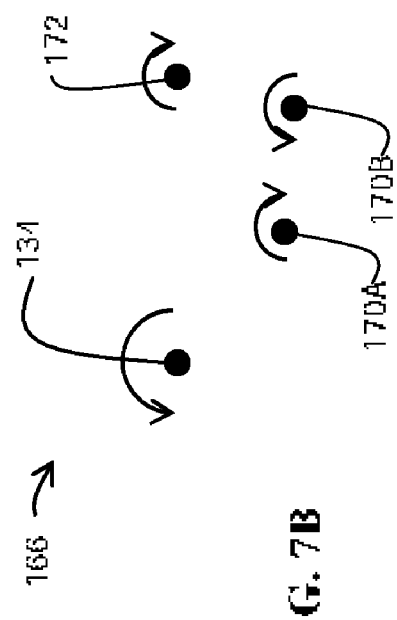

FIGS. 7A-B illustrate two top views of transmission 166 suitable for use with converter 100 the two flow conditions illustrated in FIGS. 6A-B. FIG. 7A illustrates the gearing arrangement for normal down-flow operation (FIG. 6A) wherein shaft 134 turns clockwise, an idler gear 170 turns counterclockwise, and the generator shaft 172 turns clockwise. A ratchet-type mechanism (not shown) may be provided to limit generator shaft 172 to clockwise rotation, for example. FIG. 7B illustrates the gearing arrangement for backflow or up-flow operation (FIG. 6B) wherein shaft 134 turns counter-clockwise, a first idler gear 170A turns clockwise, a second idler gear 170B turns counter-clockwise, and generator shaft 172 turns clockwise. The backflow also lifts the turbine gear on shaft 134 to facilitate its engagement with idler gear 170A, which is located above idler gear 170 to form, for example, the two-level transmission 166 illustrated in FIGS. 6A-B. When turbine gear at shaft 134 rises, it disengages from the normal flow gears in FIG. 7A and engages the backflow gears in FIG. 7B. Using two idler gear levels permits generator gear at shaft 172 to rotate counter-clockwise under all flow conditions.

As may be readily appreciated from the above description, the wave surge power converter of this invention offers several advantages. For example, other than the turbine and generator elements all converter elements may be embodied to include only concrete, PVC, rubber and neoprene. Such inexpensive and corrosion-resistant materials are well-adapted for this marine application and even better suited to fresh water applications having significant wave surges, such as the shorelines of the Great Lakes.

The preferred vertical orientation of the walls separating each of the horizontal array of independent chambers 24A-D facilitates the capture of the smaller available increments of potential energy, such as a single foot of hydraulic head. A vertical array of horizontal chambers disadvantageously requires larger hydraulic head differentials and cannot capture the smaller potential energy increments available in many surf conditions. For example, the horizontal chambers disclosed in the above-cited Anderson reference (U.S. Pat. No. 7,040,089) cannot capture significant energy from wave surges of less than two feet. Moreover, instead of the multiple load-bearing floors required for a vertical array of horizontal chambers, a single load-bearing chamber floor is sufficient for the converter of this invention. Similarly, instead of the disadvantageously large amount of air entrainment experienced with a vertical array of horizontal chambers as draining water powers a turbine, the converter of this invention entrains a minimal amount of air in water passing through drain assemblies 26A-D, plenary conduit 28, turbine 46 and out draft tube 32 to the ambient ocean 30.

During operation of the converter of this invention, hydraulic head is not lost to backflow as it is in a horizontal chamber array, for example, when a new wave fills a lower horizontal chamber while it is also receiving drainage from an upper chamber. This feature of a vertical array of horizontal chambers causes overtopping of the lower chamber; thereby losing captured potential energy to the surrounding ocean.

During operation of the converter of this invention, large volumes of water are reserved in independent chambers and remain available to buffer the continuous flow of water to the conduit and the turbine necessary for stable power output; even during a prolonged intermission (dry spell) between wave surges.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A wave surge power converter comprising:
   a plurality of openings each disposed on an incline at an elevation to receive wave surge water when a wave surges up the incline;
   a plurality of independent chambers each coupled to an associated ramp opening for capturing wave surge water received thereby and retaining the captured water in substantial hydraulic isolation from the other chambers;
   a conduit having an exit, said conduit being located substantially below said plurality of independent chambers and hydraulically interconnecting said plurality of independent chambers;
   within each of one or more chambers, a check valve disposed to permit water flow into the conduit from the chamber responsive to a hydraulic pressure difference across the check valve; and
   a generator for producing electrical power from a flow of water in the conduit arising from a hydraulic pressure difference between the conduit and the exit.

2. The wave surge power converter of claim 1 wherein the generator further comprises:
   a closed low-head turbine disposed within the conduit to rotate responsive to water flow through the conduit exit; and
   an electrical generator coupled to the low-head turbine such that the electrical generator produces electrical power responsive to rotation of the low-head turbine.

3. The wave surge power converter of claim 2 further comprising:
   a grill disposed over the plurality of openings to prevent at least some floating debris from entering the chambers, thereby promoting conversion of surf kinetic energy to potential energy embodied at least in part as a hydraulic pressure difference.

4. The wave surge power converter of claim 3 wherein at least one of the check valves is disposed to substantially prevent water flow into the chamber from the conduit.

5. The wave surge power converter of claim 4 wherein the opening elevation varies non-linearly with respect to the relative disposition of the opening along the direction of wave surge.

6. The wave surge power converter of claim 2 wherein the conduit exit is disposed such that the hydraulic pressure difference between the conduit interior and the conduit exit operates to prevent substantial water flow into the conduit from the sea.

7. The wave surge power converter of claim 2 wherein at least one of the check valves is disposed to substantially prevent water flow into the chamber from the conduit.

8. The wave surge power converter of claim 1 wherein at least one of the check valves is disposed to substantially prevent water flow into the chamber from the conduit.

9. The wave surge power converter of claim 8 wherein at least some of the plurality of openings are disposed with respect to the direction of wave surge such that the hydraulic head available from the wave surge to each of the corresponding at least some chambers differs from that available to its neighbors.

10. The wave surge power converter of claim 9 wherein the elevations of at least some of the openings vary according to relative disposition of the opening along the direction of wave surge.

11. The wave surge power converter of claim 10 wherein the generator further comprises:
    a closed low-head turbine disposed within the conduit to rotate responsive to water flow through the conduit exit; and
    an electrical generator coupled to the low-head turbine such that the electrical generator produces electrical power responsive to rotation of the low-head turbine.

12. The wave surge power converter of claim 11 further comprising:
    a grill disposed over the plurality of openings to prevent at least some floating debris from entering the chambers, thereby promoting conversion of surf kinetic energy to potential energy embodied at least in part as a hydraulic pressure difference.

13. The wave surge power converter of claim 1 further comprising:
    a grill disposed over the plurality of openings to prevent at least some floating debris from entering the chambers, thereby promoting conversion of surf kinetic energy to potential energy embodied at least in part as a hydraulic pressure difference.

14. The wave surge power converter of claim 13 wherein the conduit exit is disposed such that the hydraulic pressure difference between the conduit interior and the conduit exit operates to prevent substantial water flow into the conduit from the sea.

15. The wave surge power converter of claim 14 wherein at least one of the check valves is disposed to substantially prevent water flow into the chamber from the conduit.

16. The wave surge power converter of claim 15 wherein the generator further comprises:
    a closed low-head turbine disposed within the conduit to rotate responsive to water flow through the conduit exit; and
    an electrical generator coupled to the low-head turbine such that the electrical generator produces electrical power responsive to rotation of the low-head turbine.

17. The wave surge power converter of claim 1 wherein at least some of the plurality of openings are disposed with respect to the direction of wave surge such that the hydraulic head available from the wave surge to each of the corresponding at least some chambers differs from that available to its neighbors.

18. The wave surge power converter of claim 17 wherein the elevations of at least some of the openings vary relative disposition of the opening along the direction of wave surge.

19. The wave surge power converter of claim 1 wherein the opening elevation varies non-linearly with respect to the relative disposition of the opening along the direction of wave surge.

20. The wave surge power converter of claim 1 wherein the conduit exit is disposed such that the hydraulic pressure difference between the conduit interior and the conduit exit operates to prevent substantial water flow into the conduit from the sea.

* * * * *